United States Patent
Lee et al.

(10) Patent No.: US 8,925,011 B2
(45) Date of Patent: Dec. 30, 2014

(54) APPARATUS AND METHOD FOR PROCESSING BROADCAST CONTENT

(75) Inventors: Joo Young Lee, Deajeon (KR); Je Ho Nam, Daejeon (KR)

(73) Assignee: SK Hynix Inc., Gyeonggi-do (KR)

(*) Notice: Subject to any disclaimer, the term of this patent is extended or adjusted under 35 U.S.C. 154(b) by 174 days.

(21) Appl. No.: 13/556,291

(22) Filed: Jul. 24, 2012

(65) Prior Publication Data
US 2013/0050576 A1      Feb. 28, 2013

(30) Foreign Application Priority Data

Aug. 22, 2011   (KR) .................. 10-2011-0083621

(51) Int. Cl.
| | | |
|---|---|---|
| G06F 3/00 | (2006.01) | |
| G06F 13/00 | (2006.01) | |
| H04N 5/445 | (2011.01) | |
| H04N 21/235 | (2011.01) | |
| H04N 21/254 | (2011.01) | |
| H04N 21/4722 | (2011.01) | |
| H04N 21/81 | (2011.01) | |

(52) U.S. Cl.
CPC .......... *H04N 21/235* (2013.01); *H04N 21/254* (2013.01); *H04N 21/4722* (2013.01); *H04N 21/8133* (2013.01)
USPC .......................................................... 725/45

(58) Field of Classification Search
None
See application file for complete search history.

(56) References Cited

U.S. PATENT DOCUMENTS

| | | | |
|---|---|---|---|
| 8,209,724 B2* | 6/2012 | Rathod et al. ................... 725/53 |
| 8,264,727 B2* | 9/2012 | Watanabe et al. ............. 358/1.16 |
| 8,374,845 B2* | 2/2013 | Doi et al. ........................... 704/9 |
| 8,504,357 B2* | 8/2013 | Tsuzuki et al. ................. 704/10 |
| 2002/0042923 A1* | 4/2002 | Asmussen et al. .............. 725/92 |
| 2004/0083490 A1* | 4/2004 | Hane ................................ 725/46 |
| 2006/0184994 A1* | 8/2006 | Eyer et al. ...................... 725/136 |
| 2007/0192792 A1* | 8/2007 | Nagamatsu ..................... 725/39 |
| 2008/0244638 A1* | 10/2008 | Ryden .............................. 725/34 |
| 2008/0250452 A1* | 10/2008 | Iwamoto ......................... 725/39 |
| 2009/0271825 A1* | 10/2009 | Ryu et al. ........................ 725/44 |
| 2010/0031304 A1* | 2/2010 | Ariyoshi et al. .............. 725/119 |
| 2010/0169930 A1* | 7/2010 | Ito et al. .......................... 725/53 |
| 2012/0017239 A1* | 1/2012 | Ryu et al. ........................ 725/32 |

* cited by examiner

*Primary Examiner* — Brian T Pendleton
*Assistant Examiner* — Ryan Stronczer
(74) *Attorney, Agent, or Firm* — William Park & Associates Patent Ltd.

(57) ABSTRACT

Provided is an apparatus and method for processing broadcast content. According to embodiments of the present invention, it is possible to reduce a cost for generating additional data and providing the additional data to a user by extracting a keyword from information about captions included in broadcast content, and generating additional information associated with the extracted keyword.

19 Claims, 10 Drawing Sheets

APPARATUS AND METHOD FOR PROCESSING BROADCAST CONTENT

CROSS-REFERENCE TO RELATED APPLICATION

This application claims the benefit of Korean Patent Application No. 10-2011-0083621, filed on Aug. 22, 2011, in the Korean Intellectual Property Office, the disclosure of which is incorporated herein by reference.

BACKGROUND

1. Field of the Invention

The present invention relates to an apparatus and method for processing broadcast content, and more particularly, to an apparatus and method for processing additional information, a keyword associated with broadcast content, and the like.

2. Description of the Related Art

A digital television (DTV) closed captioning may correspond to a service that provides captions for a broadcast program so as to provide broader access to a broadcast for information-alienated social groups such as the disabled, the elderly and people in poor health, foreigners, and the like. Korean standards for a DTV closed captioning were completed in June, 2007 and most of current ground-wave broadcasts may include a closed captioning service. Compulsory closed captioning of all ground-wave broadcast services is enforced by the "law on a prohibition on discrimination and a remedy for violation of rights of the disabled" enacted in April, 2008. Currently, a large number of DTVs may include a function of extracting and providing information about captions included in a moving pictures exports group (MPEG)-2 transport stream (TS) ground-wave broadcast signal, and various platforms such as a personal computer (PC), and the like may gradually support a closed captioning service.

As described in the foregoing, an original intent of the closed captioning service may correspond to an providing broader access to a broadcast for information-alienated social groups. However, information about a closed captioning may correspond to a type of description metadata for broadcast content and thus, various services may be broadened using the corresponding information. In particular, since a cost for inserting broadcast content metadata is relatively modest, utilizing information about captions included in most of ground-wave broadcast contents may significantly decrease an additional burden of implementing such a service.

SUMMARY

An aspect of the present invention may reduce a cost of generating additional data and providing the additional data to a user by a client terminal that generates additional information associated with broadcast content using a keyword in response to a caption extractor extracting the keyword from information about captions included in received broadcast content, and transmitting the extracted keyword to the client terminal. Further, the client terminal may provide a search function for broadcast content using a keyword.

According to an aspect of the present invention, there is provided an apparatus for processing broadcast content, the apparatus including a receiver to receive broadcast content including information about captions, a caption extractor to extract the information about captions from the received broadcast content, a keyword detector to detect, from the information about captions, at least one keyword associated with the broadcast content, and a transmitter to transmit the at least one keyword to a client terminal.

According to another aspect of the present invention, there is provided a method of processing broadcast content, the method including receiving broadcast content including information about captions, extracting the information about captions from the received broadcast content, detecting, from the information about captions, at least one keyword associated with the broadcast content, and transmitting the at least one keyword to a client terminal.

According to an embodiment of the present invention, it is possible to reduce a cost of generating additional data and providing the additional data to a user by a client terminal that generates additional information associated with broadcast content using a keyword in response to a caption extractor extracting the keyword from information about captions included in received broadcast content, and transmitting the extracted keyword to the client terminal. Further, the client terminal may provide a search function for broadcast content using a keyword.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
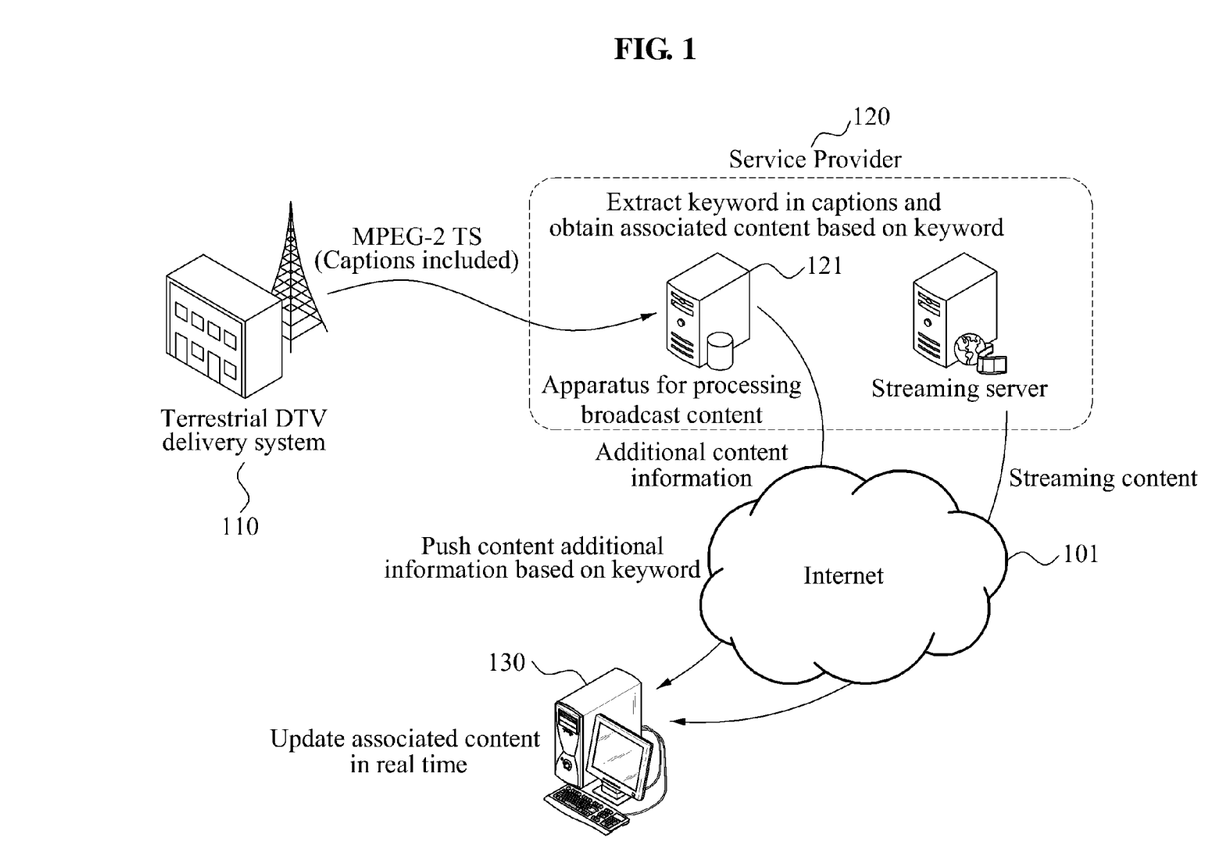
FIG. 1 is a diagram illustrating a system for providing additional broadcast content information based on information about captions according to an embodiment of the present invention.

FIG. 1 is a diagram illustrating a system for providing additional broadcast content information based on information about captions according to an embodiment of the present invention.

Referring to FIG. 1, a service provider 120 of a system for providing additional broadcast content information based on information about captions according to an embodiment of the present invention may provide, using an apparatus for processing broadcast content 121 based on information about captions, a keyword associated with additional information for ground-wave retransmission streaming content to a viewer terminal 130 via the Internet 101. The viewer terminal 130 may use the received keyword to generate or retrieve the additional information for ground-wave retransmission streaming content.

In this instance, the apparatus for processing broadcast content 121 based on information about captions according to embodiments of the present invention may receive a moving pictures exports group (MPEG)-2 transport stream (TS) signal from a ground-wave digital television (DTV) delivery system 110. The apparatus for processing broadcast content 121 may extract a keyword associated with broadcast content from information about captions included in the received MPEG-2 TS signal. The apparatus for processing broadcast content 121 may transmit the extracted keyword to the viewer terminal 130. In this instance, the viewer terminal 130 may generate or retrieve additional information associated with the broadcast content based on the received keyword. Additional information according to embodiments of the present invention may include news, a movie, a television program, document information, character information, geography information, sound source information, and the like associated with the broadcast content. Thus, a viewer may view ground-wave retransmission content, and use the additional information associated with the broadcast content.

Figure 2:
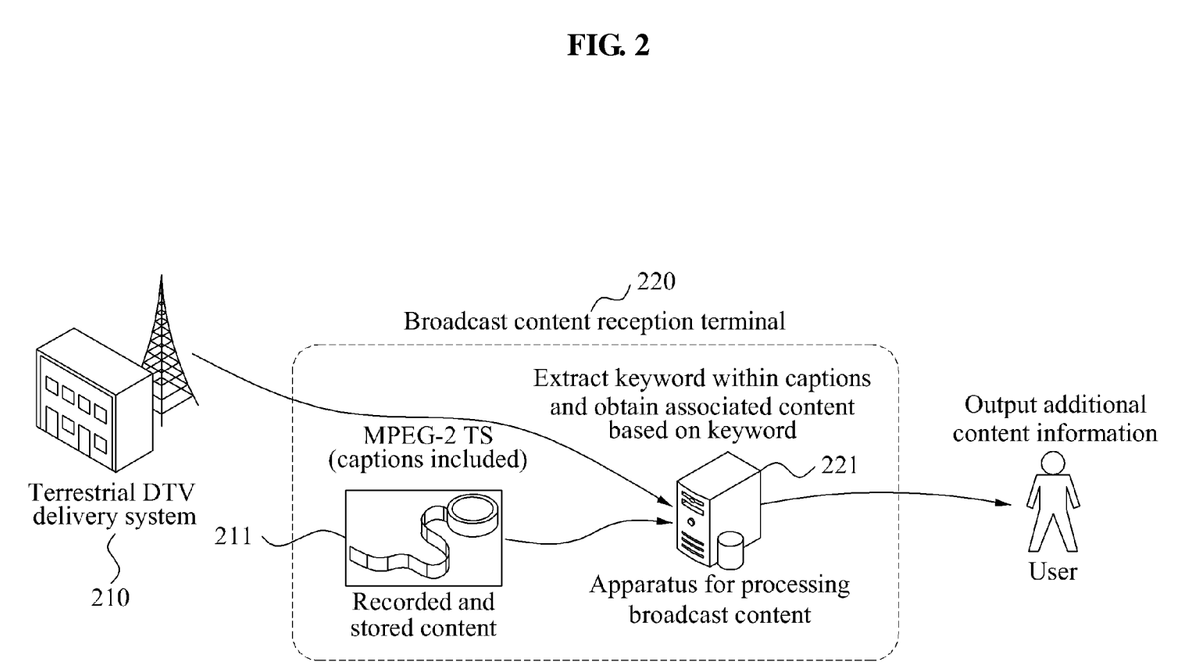
FIG. 2 is a diagram illustrating a system for providing additional broadcast content information based on information about captions according to another embodiment of the present invention.

FIG. 2 is a diagram illustrating a system for providing additional broadcast content information based on information about captions according to another embodiment of the present invention.

Referring to FIG. 2, an apparatus for processing broadcast content 221 included in a broadcast content reception terminal 220 according to embodiments of the present invention may receive recorded and stored content 211 or a broadcast signal in an MPEG-2 TS form received from a ground-wave DTV delivery system 210.

The apparatus for processing broadcast content 221 may extract a keyword associated with broadcast content from information about captions included in the recorded and stored content 211 or the broadcast signal received from the ground-wave DTV delivery system 210.

The apparatus for processing broadcast content 221 may generate additional information associated with the broadcast content based on the extracted keyword. The additional information may include news, a movie, a television program, document information, character information, geography information, sound source information, and the like associated with the broadcast content.

FIGS. 3 through 8 are diagrams a system for providing additional broadcast content information based on information about captions implemented by various types of clients according to embodiments of the present invention.

An apparatus for processing broadcast content according to embodiments of the present invention may discriminatively change a keyword transmission time by performing an operation such as applying an intended delay time to a keyword transmission time according to a type of a broadcast network used by a client terminal.

Figure 3:
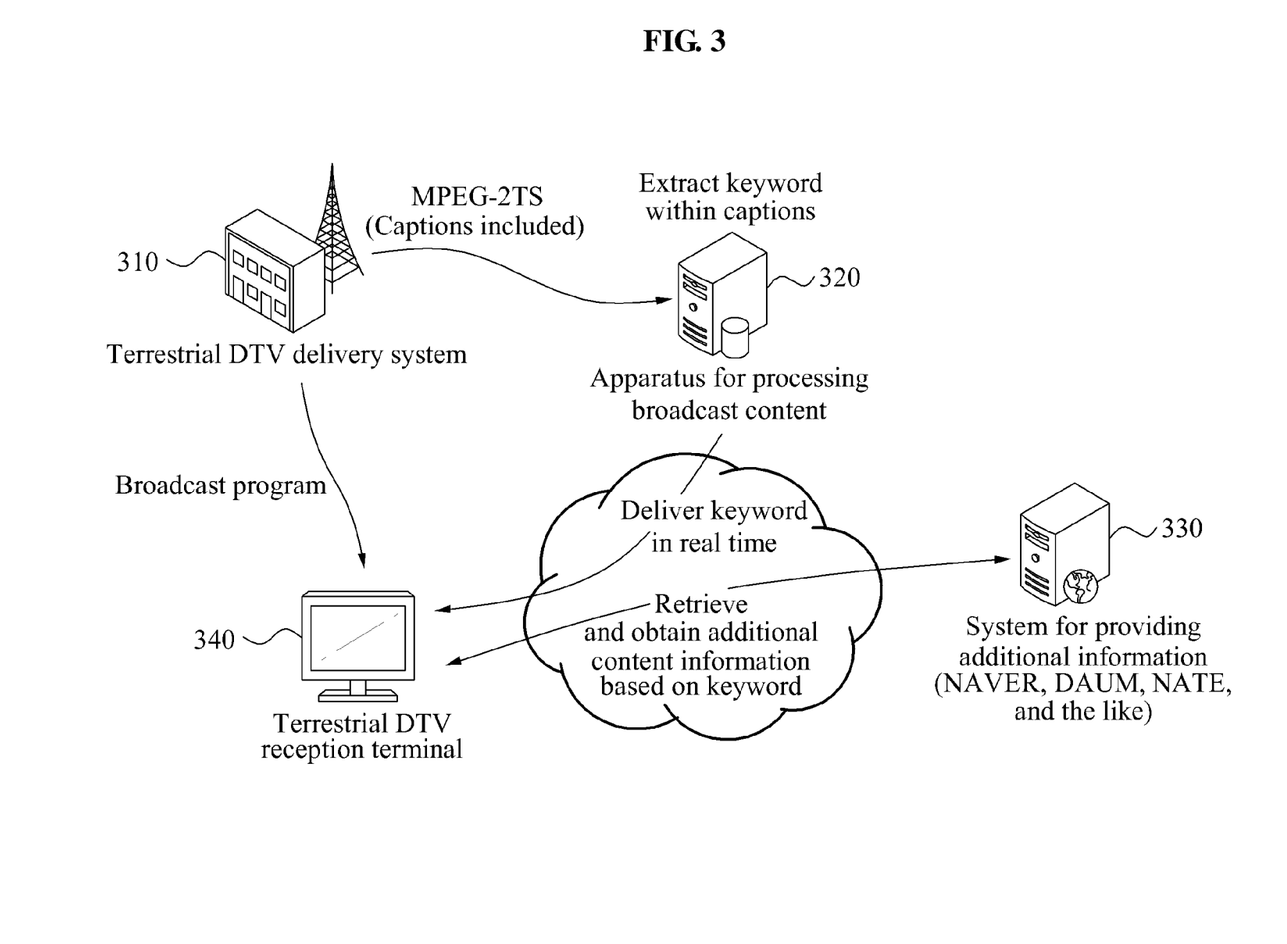
FIGS. 3 through 8 are diagrams illustrating a system for providing additional broadcast content information based on information about captions implemented by various types of clients according to embodiments of the present invention.

As illustrated in FIG. 3, the present invention may be applied to a ground-wave DTV reception client.

Referring to FIG. 3, in response to a ground-wave DTV delivery system 310 delivering an MPEG-2 TS signal including information about captions, an apparatus for processing broadcast content 320 may extract the information about captions from the received MPEG-2 TS signal, and detect a keyword associated with broadcast content from the extracted information about captions.

In response, a transmitter of the apparatus for processing broadcast content 320 may verify a type of a client terminal, and determine whether to transmit the at least one detected keyword after a predetermined delay time based on the verified type of the client terminal.

For example, referring to FIG. 3, the client terminal may be considered a ground-wave DTV reception terminal 340.

That is, when a delay time is relatively short, for example, when the client terminal receives a broadcast program via a ground-wave DTV broadcasting network, the transmitter of the apparatus for processing broadcast content 320 may rapidly transmit a keyword without delay.

In response, the ground-wave DTV reception terminal 340 may use the received keyword to retrieve, obtain, and use content based on the keyword from a system for providing additional information 330 that provides a portal service such as NAVER, DAUM, NATE, and the like.

Figure 4:
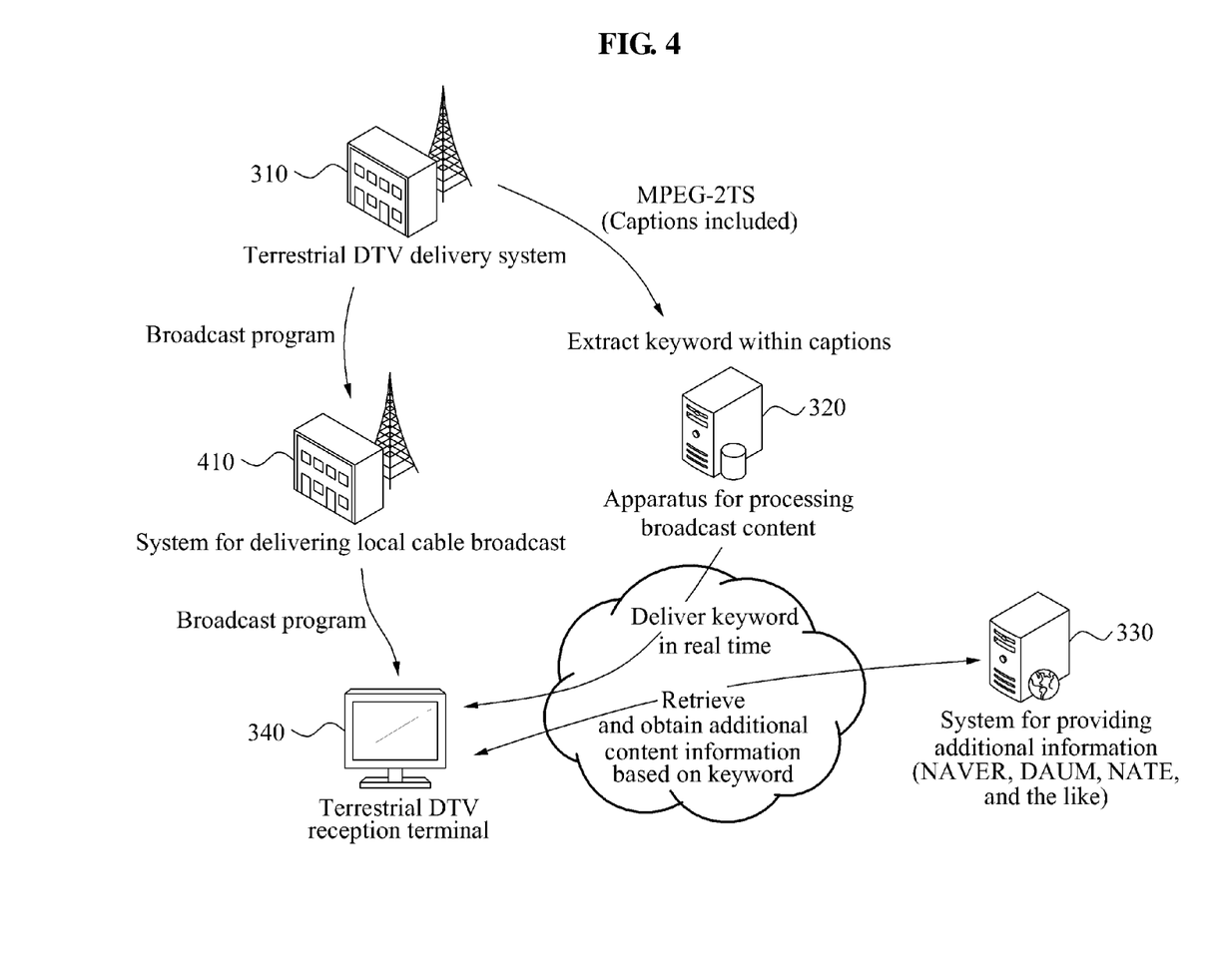

As illustrated in FIG. 4, the present invention may be applied to a cable retransmission environment client.

Referring to FIG. 4, the ground-wave DTV delivery system 310 may deliver an MPEG-2 TS signal including information about captions.

In this instance, the MPEG-2 TS signal may be delivered to the apparatus for processing broadcast content 320 and a system for delivering a local cable broadcast 410, and the apparatus for processing broadcast content 320 may detect a keyword associated with broadcast content.

The system for delivering a local cable broadcast 410 may retransmit the received MPEG-2 TS signal to the ground-wave DTV reception terminal 340.

Due to the retransmission, a long period of time, in comparison to FIG. 3, may be used to deliver the MPEG-2 TS signal from the ground-wave DTV delivery system 310 to the ground-wave DTV reception terminal 340. Thus, in consideration of the period of time, the apparatus for processing broadcast content 320 may transmit the detected keyword to the ground-wave DTV reception terminal 340 after a predetermined delay time.

A delay time for transmitting a keyword may be calculated based on a period of time for receiving a ground-wave broadcast stream from the apparatus for processing broadcast content 320 and extracting a keyword from captions, and an expected period of time for transmitting the extracted keyword to a client terminal, and the like.

As an example, when a retransmission delay time corresponds to ten seconds, and a sum of a period of time for extracting a keyword by the apparatus for processing broadcast content 320 and an expected period of time for transmitting the extracted keyword to a terminal corresponds to five seconds, the apparatus for processing broadcast content 320 may delay a keyword transmission for a period of five seconds.

As another example, when a broadcast program received by the client terminal corresponds to, for example, a delayed broadcast, a local broadcast, and the like other than a simultaneous broadcast of a broadcast in a ground-wave environment, the apparatus for processing broadcast content 320 may determine whether to transmit a keyword or a transmission time based on a broadcast schedule for each broadcast network.

As still another example, when a broadcast program received by the client terminal corresponds to a delayed broadcast, the apparatus for processing broadcast content 320 may extract a keyword from a ground-wave broadcast network in advance, store, and then transmit the extracted keyword during a period of time in which the corresponding broadcast program is broadcast.

As yet another example, when a broadcast program received by the client terminal corresponds to a video on demand (VOD), the apparatus for processing broadcast content 320 may extract a keyword from a ground-wave broadcast network in advance, store, and then transmit the extracted keyword when the corresponding broadcast program requests the extracted keyword.

Figure 5:
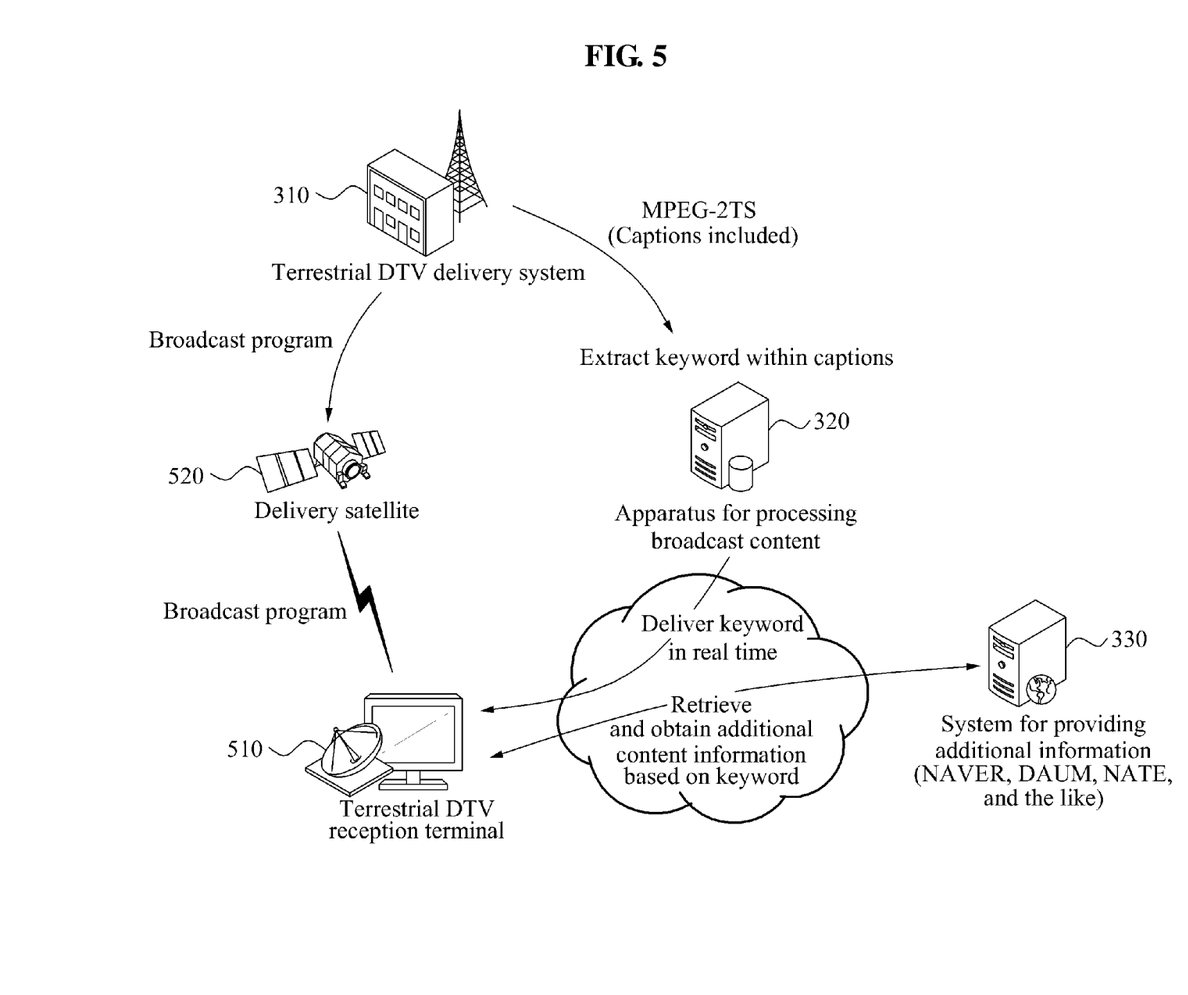

As illustrated in FIG. 5, the present invention may be applied to a client in a satellite broadcast environment.

Referring to FIG. 5, the ground-wave DTV delivery system 310 may deliver, using a delivery satellite 520, an MPEG-2 TS signal including information about captions to a ground-wave DTV reception terminal 510 that operates in conjunction with a satellite receiver.

The apparatus for processing broadcast content 320 may transmit a detected keyword to the ground-wave DTV reception terminal 510 after delaying the detected keyword for a predetermined period of time based on a characteristic of the delivery satellite 520.

Figure 6:
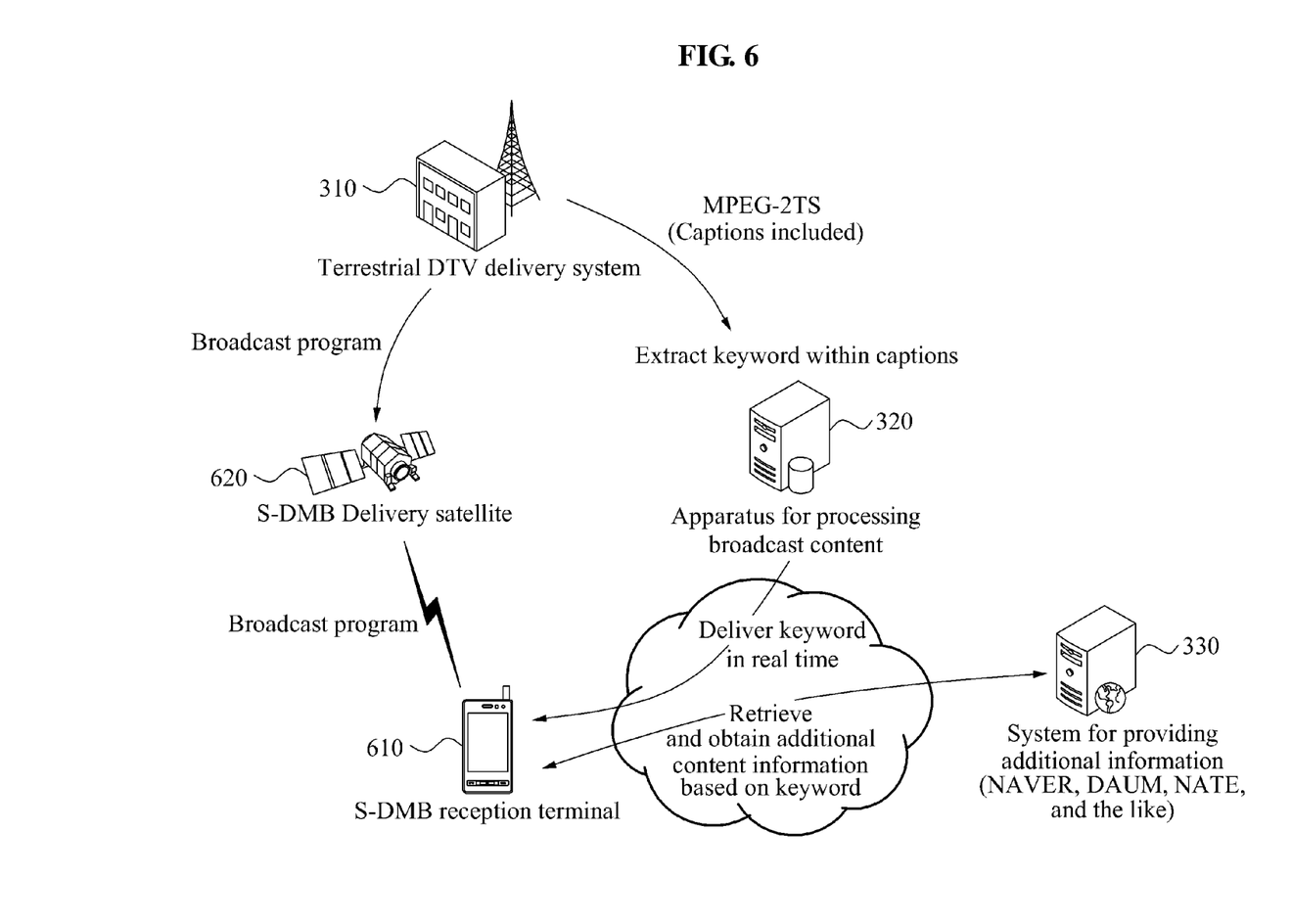

As illustrated in FIG. 6, the present invention may be applied to a client in a satellite broadcast environment.

Referring to FIG. 6, the ground-wave DTV delivery system 310 may deliver, using an S-digital multimedia broadcasting (DMB) delivery satellite 620, an MPEG-2 TS signal including information about captions to an S-DMB reception terminal 610.

In this instance, the apparatus for processing broadcast content 320 may determine whether to delay a detected keyword for a predetermined period of time based on a characteristic of the S-DMB delivery satellite 620.

In a case in which a delay occurs while the MPEG-2 TS signal is delivered to the S-DMB reception terminal 610 via the S-DMB delivery satellite 620, the apparatus for processing broadcast content 320 may transmit the detected keyword to the S-DMB reception terminal 610 after delaying the detected keyword for a predetermined period of time by reflecting a degree of the occurring delay.

When the delay is relatively insignificant, the apparatus for processing broadcast content 320 may transmit the detected keyword to the S-DMB reception terminal 610 without delay.

Figure 7:
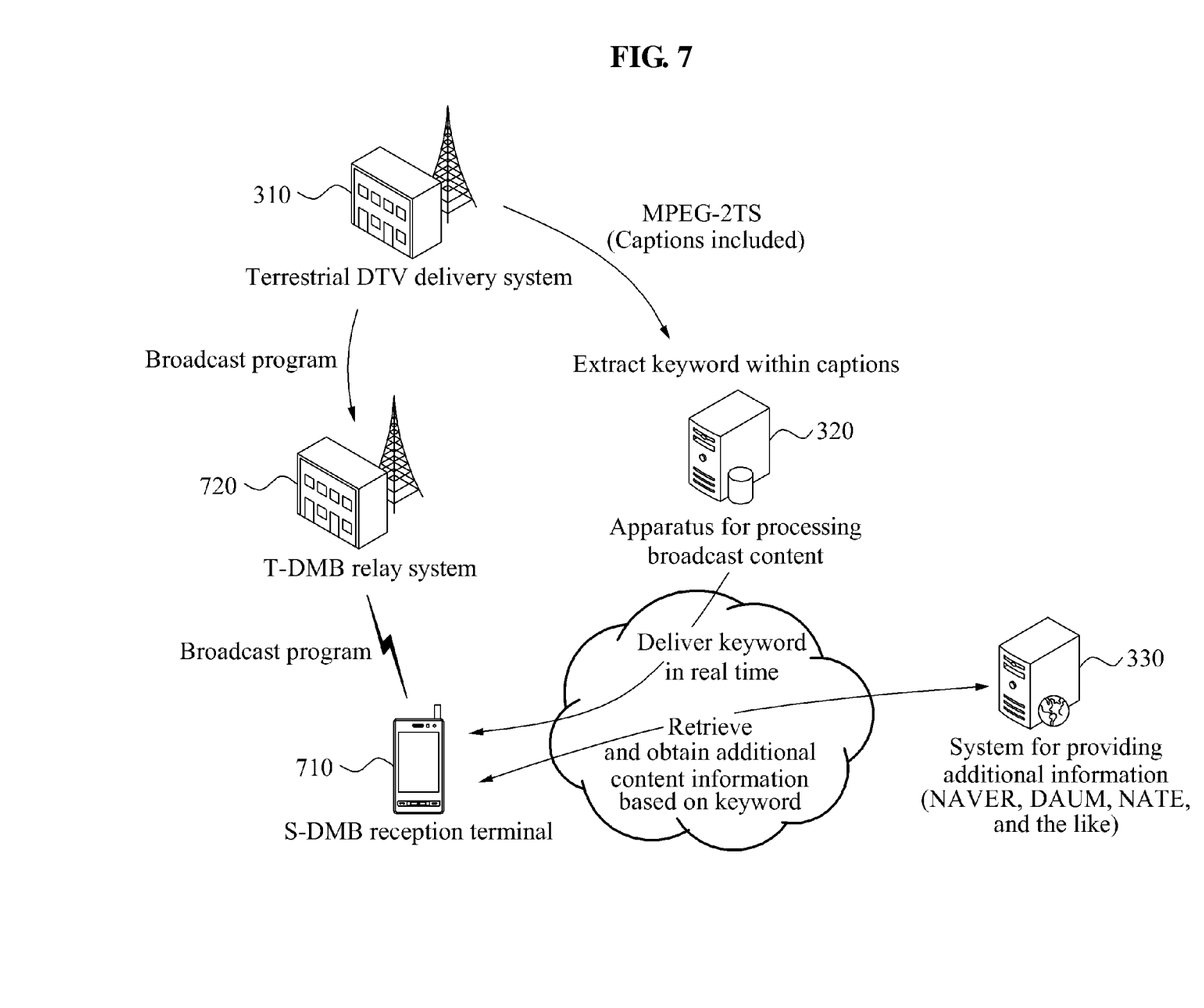

Similar to FIG. 6, the present invention may be applied to a client in a ground-wave broadcast environment.

Referring to FIG. 7, the ground-wave DTV delivery system 310 may deliver, using a T-DMB relay system 720, an MPEG-2 TS signal including information about captions to an S-DMB reception terminal 710.

Likewise, the apparatus for processing broadcast content 320 may verify a characteristic of the T-DMB relay system 720, delay the detected keyword for a predetermined period of time based on the verified characteristic, and then transmit the detected keyword to the S-DMB reception terminal 710.

When the delay is relatively negligible, the apparatus for processing broadcast content 320 may transmit the detected keyword to the S-DMB reception terminal 710 without delay.

Figure 8:
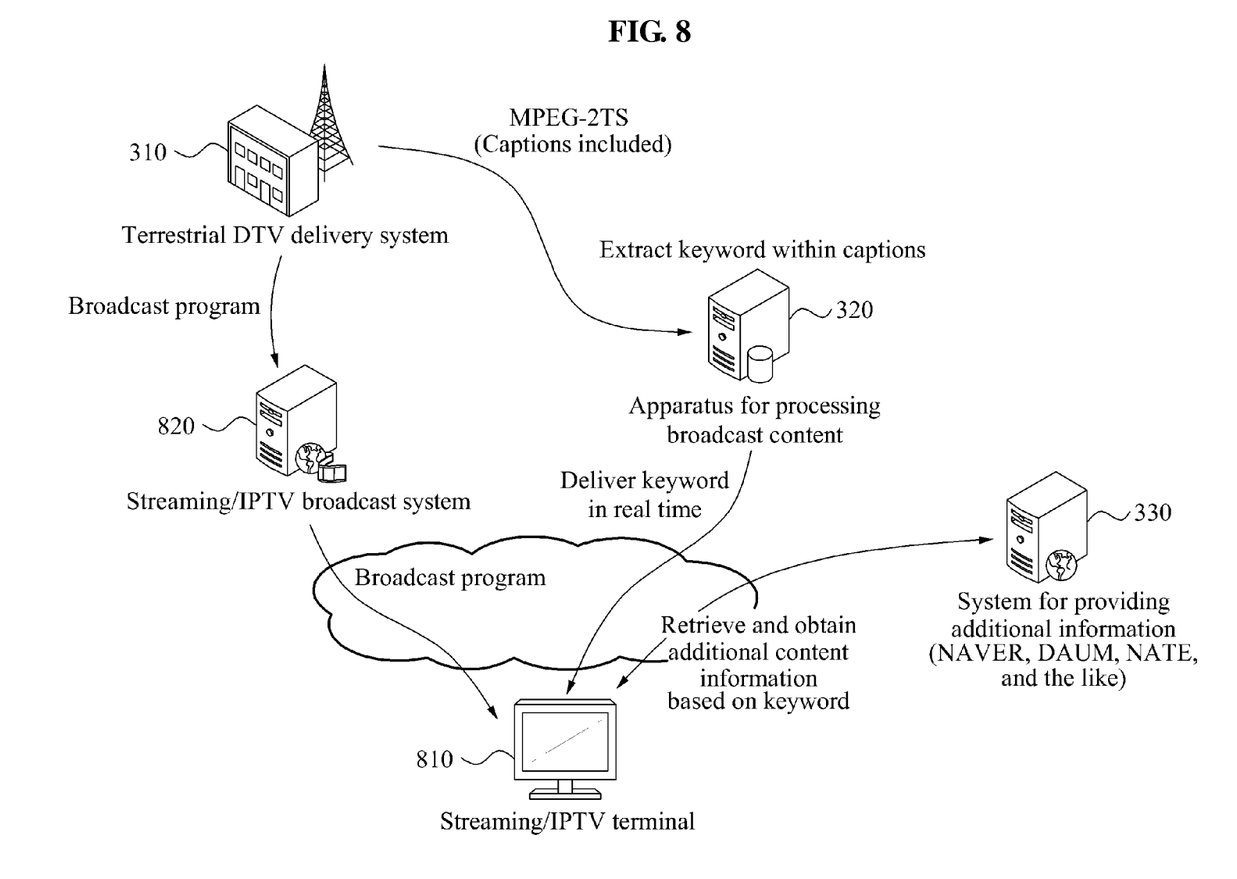

As illustrated in FIG. 8, the present invention may be applied to a client in a streaming/Internet protocol television (IPTV) environment.

Referring to FIG. 8, the ground-wave DTV delivery system 310 may deliver, using a streaming/IPTV broadcast system 820, an MPEG-2 TS signal including information about captions to a streaming/IPTV terminal 810.

In this instance, the apparatus for processing broadcast content 320 may verify a characteristic of the streaming/IPTV broadcast system 820, delay the detected keyword for a predetermined period of time based on the verified characteristic, and then transmit the detected keyword to the streaming/IPTV terminal 810.

Figure 9:
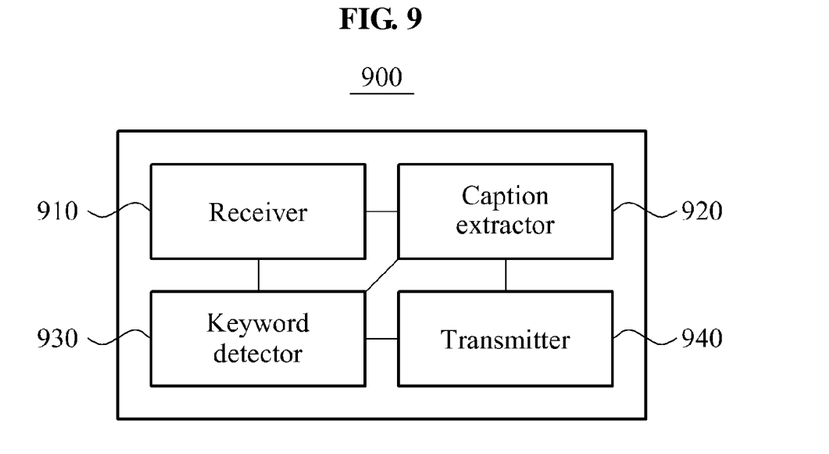
FIG. 9 is a diagram illustrating a configuration of an apparatus for processing broadcast content based on information about captions according to embodiments of the present invention.

FIG. 9 is a diagram illustrating a configuration of an apparatus for processing broadcast content based on information about captions according to embodiments of the present invention.

Referring to FIG. 9, an apparatus for processing broadcast content according to embodiments of the present invention may include a receiver 910, captions extractor 920, a keyword detector 930, and a transmitter 940.

The receiver 910 may receive broadcast content including information about captions.

The receiver 910 according to embodiments of the present invention may receive a broadcast stream for MPEG-2 TS broadcast content. In this instance, the broadcast stream for MPEG-2 TS broadcast content may correspond to one of a broadcast stream received through a ground wave or a cable broadcast network and a broadcast stream for recorded and stored broadcast content.

The receiver 910 according to embodiments of the present invention may receive, from a ground-wave DTV delivery system, broadcast content including information about captions.

The caption extractor 920 may extract the information about captions from the received broadcast content.

According to embodiments of the present invention, the caption extractor 920 may demultiplex the broadcast content, for example, the broadcast stream for MPEG-2 TS broadcast content. The caption extractor 920 may analyze an attribute of the information about captions based on a caption service descriptor (CSD) included in one of a program map table (PMT) of program specific information (PSI) and an event information table (EIT) of a program and system information protocol (PSIP). The caption extractor 920 may extract the information about captions from a cc data( ) field included in user data of a packetized elementary stream (PES). In this instance, the caption extractor 920 may synchronize the extracted information about captions using a presentation time stamp (PTS) included in a header of the PES.

According to embodiments of the present invention, the caption extractor 920 may extract the information about captions from the received broadcast content according to an extracting scheme corresponding to a standard of a broadcast content stream.

The keyword detector 930 may detect, from the extracted information about captions, at least one keyword associated with the broadcast content.

The keyword detector 930 according to embodiments of the present invention may detect a word, matching the at least one keyword associated with the broadcast content, included in a keyword pool having a predetermined plurality of keywords among a plurality of words included in the information about captions with reference to the keyword pool.

The keyword detector 930 according to embodiments of the present invention may calculate a number of occurrences, a degree of rarity, and the like of a plurality of words included in the information about captions, and calculate a degree of importance of each of the plurality of words based on the calculated number of occurrences, degree of rarity, and the like. In this instance, the keyword detector 930 may detect a word, matching the at least one keyword associated with the broadcast content, having the degree of importance greater than or equal to a predetermined value.

According to embodiments of the present invention, the keyword detector 930 may extract a plurality of candidate words for the at least one keyword associated with the broadcast content by analyzing a morpheme of a plurality of words included in the information about captions. The keyword detector 930 according to embodiments of the present invention may extract a noun, a proper noun, and a portion of a phrase in quotation marks, and the like matching the plurality of candidate words. The keyword detector 930 may weight a predetermined location of the information about captions based on an attribute of the information about captions, and extract a word, matching the plurality of candidate words, included in the weighted predetermined location. For example, when the information about captions is associated with news, that is, an attribute of the information about captions corresponds to 'news,' the keyword detector 930 may weight captions of an anchor part, and extract a keyword, matching the plurality of candidate words, included in the captions of the anchor part.

In response to the plurality of candidate words being extracted, the keyword detector 930 may detect the at least one keyword from the plurality of extracted candidate words.

In this instance, the keyword detector 930 according to embodiments of the present invention may detect a word, matching the at least one keyword associated with the broadcast content, included in a keyword pool having a predetermined plurality of keywords among a plurality of words with reference to the keyword pool.

The keyword detector 930 may calculate a number of occurrences, a degree of rarity, and the like of a plurality of words, and calculate a degree of importance for each of the plurality of words based on the calculated number of occurrences, degree of rarity, and the like. In this instance, the keyword detector 930 may detect a word, matching the at least one keyword associated with the broadcast content, having the degree of importance greater than or equal to a predetermined value.

The keyword detector 930 may detect all of the plurality of candidate words matching the at least one keyword associated with the broadcast content when a number of the plurality of candidate words is less than a predetermined value.

The transmitter 940 may transmit the at least one keyword to a client terminal.

The client terminal according to embodiments of the present invention may receive at least one keyword, and generate additional information associated with broadcast content based on the at least one received keyword.

The additional information according to embodiments of the present invention may include news, a movie, a television program, document information, character information, geography information, and sound source information, and the like associated with the broadcast content. Depending on embodiments, the client terminal may generate additional information by retrieving the additional information as a keyword by utilizing an open application programmer interface (API) of a service provider such as a portal site, and the like.

Additional information associated with the broadcast content that is provided as an embodiment of the present invention may correspond to various content information associated with a keyword such as news, a movie, a television program, document information, character information, geography information, and sound source information, and the like associated with the broadcast content retrieved by a keyword detected using an open API of various service providers including a portal site. In addition, provided additional information associated with the broadcast content may include the keyword.

The client terminal according to embodiments of the present invention may receive at least one keyword, and provide a search function for broadcast content based on the at least one received keyword.

Depending on embodiments, the client terminal may display the at least one received keyword on a display unit. In this instance, a user of the client terminal may select a keyword desired to be retrieved from displayed keywords. In response to a selection signal being input from the user, the client terminal may open a web browser, and provide a search result for a keyword corresponding to the selection signal.

The transmitter 940 according to embodiments of the present invention may verify a broadcast network of the client terminal, and transmit the at least one detected keyword after a predetermined delay time based on a type of the verified broadcast network.

When the broadcast content is delivered according to a broadcast schedule of the broadcast network, the transmitter 940 according to embodiments of the present invention may determine, using the broadcast schedule, at least one of whether to transmit the at least one keyword and a transmission time of the at least one keyword.

When the broadcast network corresponds to a groundwave broadcast network, the transmitter 940 according to embodiments of the present invention may extract and store the at least one keyword from the ground-wave broadcast network, and transmit the at least one extracted keyword to the client terminal during a period of time at which the broadcast content is delivered.

Figure 10:
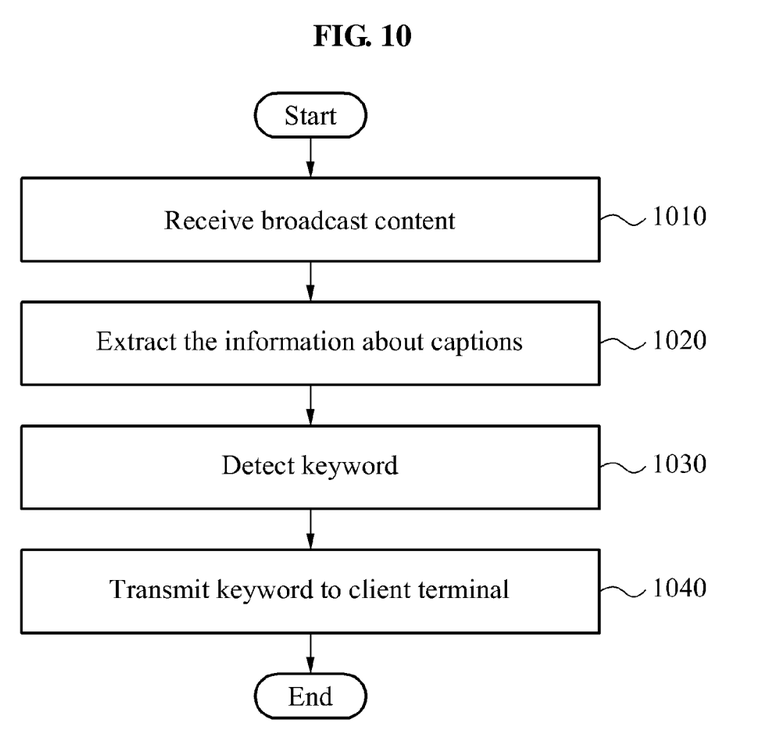
FIG. 10 is a flowchart illustrating a method of processing broadcast content according to embodiments of the present invention.

FIG. 10 is a flowchart illustrating a method of processing broadcast content according to embodiments of the present invention.

Referring to FIG. 10, in operation 1010, the method of processing broadcast content according to embodiments of the present invention may receive broadcast content including information about captions.

The method of processing broadcast content according to embodiments of the present invention may receive a broadcast stream for MPEG-2 TS broadcast content. In this instance, the broadcast stream for MPEG-2 TS broadcast content may correspond to one of a broadcast stream received through a ground wave or a cable broadcast network and a broadcast stream for recorded and stored broadcast content.

The method of processing broadcast content according to embodiments of the present invention may receive, from a ground-wave DTV delivery system, broadcast content including information about captions.

In operation 1020, the method of processing broadcast content according to embodiments of the present invention may extract the information about captions from the received broadcast content.

According to embodiments of the present invention, the method of processing broadcast content may demultiplex the broadcast content, for example, the broadcast stream for MPEG-2 TS broadcast content. The method of processing broadcast content may analyze an attribute of the information about captions based on a CSD included in one of a PMT of PSI and an EIT of a PSIP. The method of processing broadcast content may extract the information about captions from a cc_data( ) field included in user data of a PES. In this instance, the method of processing broadcast content may synchronize the extracted information about captions using a PTS included in a header of the PES.

According to embodiments of the present invention, the method of processing broadcast content may extract the information about captions from the received broadcast content according to an extracting scheme corresponding to a standard of a broadcast content stream.

In operation 1030, the method of processing broadcast content may detect, from the extracted information about captions, at least one keyword associated with the broadcast content.

The method of processing broadcast content according to embodiments of the present invention may detect a word, matching the at least one keyword associated with the broadcast content, included in a keyword pool having a predetermined plurality of keywords among a plurality of words included in the information about captions with reference to the keyword pool.

The method of processing broadcast content according to embodiments of the present invention may calculate a number of occurrences, a degree of rarity, and the like of a plurality of words included in the information about captions, and calculate a degree of importance of each of the plurality of words based on the calculated number of occurrences, degree of rarity, and the like. In this instance, the method of processing broadcast content may detect a word, matching the at least one keyword associated with the broadcast content, having the degree of importance greater than or equal to a predetermined value.

According to embodiments of the present invention, the method of processing broadcast content may extract a plurality of candidate words for the at least one keyword associated with the broadcast content by analyzing a morpheme of a plurality of words included in the information about captions. The method of processing broadcast content according to embodiments of the present invention may extract a noun, a proper noun, and a portion in quotation marks, and the like matching the plurality of candidate words. The method of processing broadcast content may weight a predetermined location of the information about captions based on an attribute of the information about captions, and extract a word, matching the plurality of candidate words, included in the weighted predetermined location. For example, when the information about captions is associated with news, that is, an attribute of the information about captions corresponds to 'news,' the method of processing broadcast content may weight captions of an anchor part, and extract a keyword, matching the plurality of candidate words, included in the captions of the anchor part.

In response to the plurality of candidate words being extracted, the method of processing broadcast content may detect the at least one keyword from the plurality of extracted candidate words.

In this instance, the method of processing broadcast content according to embodiments of the present invention may detect a word, matching the at least one keyword associated with the broadcast content, included in a keyword pool having a predetermined plurality of keywords among a plurality of words with reference to the keyword pool.

The method of processing broadcast content may calculate a number of occurrences, a degree of rarity, and the like of a plurality of words, and calculate a degree of importance of each of the plurality of words based on the calculated number of occurrences, degree of rarity, and the like. In this instance, the method of processing broadcast content may detect a word, matching the at least one keyword associated with the broadcast content, having the degree of importance greater than or equal to a predetermined value.

The method of processing broadcast content may detect all of the plurality of candidate words matching the at least one keyword associated with the broadcast content when a number of the plurality of candidate words is less than a predetermined value.

In operation 1040, the method of processing broadcast content may transmit the at least one keyword to a client terminal.

For example, the method of processing broadcast content may verify a broadcast network of the client terminal, and transmit the at least one detected keyword after a predetermined delay time based on a type of the verified broadcast network.

The client terminal may receive at least one keyword, and generate additional information associated with broadcast content based on the at least one received keyword.

The additional information according to embodiments of the present invention may include news, a movie, a television program, document information, character information, geography information, and sound source information, and the like associated with the broadcast content. Depending on embodiments, the client terminal may generate additional information by retrieving the additional information as a keyword by utilizing an open API of a service provider such as a portal site, and the like.

The client terminal according to embodiments of the present invention may receive at least one keyword, and provide a search function for broadcast content based on the at least one received keyword.

Depending on embodiments, the client terminal may display the at least one received keyword on a display unit. In this instance, a user of the client terminal may select a keyword desired to be retrieved among displayed keywords. In response to a selection signal being input from the user, the client terminal may activate a web browser, and provide a search result for a keyword corresponding to the selection signal.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus comprising:
    a receiver configured to receive broadcast content including information about captions;
    a caption extractor configured to extract the information about captions from the received broadcast content;
    a keyword detector configured to detect, from the information about captions, at least one keyword associated with the broadcast content; and
    a transmitter configured to verify a broadcast network of a client terminal and transmit the at least one keyword to the client terminal after a predetermined delay time based on a type of the verified broadcast network.

2. The apparatus of claim 1, wherein the client terminal is configured to generate additional information associated with the broadcast content based on the at least one keyword.

3. The apparatus of claim 1, wherein the client terminal is configured to provide a search function for the broadcast content based on the at least one keyword.

4. The apparatus of claim 1, wherein the caption extractor is configured to:
    demultiplex the broadcast content;
    analyze an attribute of the information about captions based on a caption service descriptor (CSD) included in one of a program map table (PMT) of program specific information (PSI) and an event information table (EIT) of a program and system information protocol (PSIP); and
    extract the information about captions from user data of a packetized elementary stream (PES).

5. The apparatus of claim 1, wherein the caption extractor is configured to synchronizes the information about captions using a presentation time stamp (PTS) included in a header of a packetized elementary stream (PES).

6. The apparatus of claim 1, wherein the keyword detector is configured to detect a word that matches the at least one keyword and is included in a keyword pool having a predetermined plurality of keywords among a plurality of words included in the information about captions.

7. The apparatus of claim 1, wherein the keyword detector is configured to:
    calculate at least one of a number of occurrences and a degree of rarity of a plurality of words included in the information about captions,
    calculate a degree of importance of the plurality of words based on the at least one of the number of occurrences and the degree of rarity, and
    detect a word that matches the at least one keyword and has a degree of importance greater than or equal to a predetermined value.

8. The apparatus of claim 1, wherein the keyword detector is configured to extract a plurality of candidate words for the at least one keyword by analyzing a morpheme of a plurality of words included in the information about captions and detect the at least one keyword from the plurality of extracted candidate words.

9. The apparatus of claim 1, wherein the keyword detector is configured to extract at least one of a noun, a proper noun, and a portion in quotation marks matching a plurality of candidate words among the plurality of words included in the information about captions.

10. The apparatus of claim 1, wherein the keyword detector is configured to:
    weight a predetermined location of the information about captions based on an attribute of the information about captions and
    extract a word that matches a plurality of candidate words and is included in the weighted predetermined location.

11. The apparatus of claim 8, wherein the keyword detector is configured to detect the plurality of candidate words matching the at least one keyword when a number of the plurality of candidate words is less than a predetermined value.

12. The apparatus of claim 2, wherein the additional information comprises at least one of news, a movie, a television program, document information, character information, geography information, and sound source information associated with the broadcast content.

13. The apparatus of claim 1, wherein, when the broadcast content is delivered according to a broadcast schedule of the broadcast network, the transmitter is configured to determine, using the broadcast schedule, at least one of whether to transmit the at least one keyword and whether to transmit a transmission time of the at least one keyword.

14. The apparatus of claim 1, wherein, when the broadcast network corresponds to a ground-wave broadcast network, the transmitter is configured to extract and store the at least one keyword from the ground-wave broadcast network and transmit the at least one extracted keyword to the client terminal during a period of time at which the broadcast content is delivered.

15. A method comprising:
    receiving broadcast content including information about captions;
    extracting the information about captions from the received broadcast content;
    detecting, from the information about captions, at least one keyword associated with the broadcast content;
    verifying a broadcast network of a client terminal; and
    transmitting the at least one keyword to the client terminal after a predetermined delay time based on a type of the verified broadcast network.

16. The method of claim 15, wherein the extracting comprises:
    demultiplexing the broadcast content;
    analyzing an attribute of the information about captions based on a caption service descriptor (CSD) included in one of a program map table (PMT) of program specific information (PSI) and an event information table (EIT) of a program and system information protocol (PSIP); and
    extracting the information about captions from user data of a packetized elementary stream (PES).

17. The method of claim 15, wherein the detecting comprises:
    calculating at least one of a number of occurrences and a degree of rarity of a plurality of words included in the information about captions;
    calculating a degree of importance of the plurality of words based on the at least one of the number of occurrences and the degree of rarity; and
    detecting a word that matches the at least one keyword and has a degree of importance greater than or equal to a predetermined value.

18. The method of claim 15, wherein the detecting comprises:
    extracting a plurality of candidate words for the at least one keyword by analyzing a morpheme of a plurality of words included in the information about captions; and
    detecting the at least one keyword from the plurality of extracted candidate words.

19. A method comprising:
    receiving broadcast content including caption information from a ground-wave broadcast network;
    extracting the caption information from the broadcast content;
    detecting within the caption information at least one keyword associated with the broadcast content; and
    transmitting the at least one keyword to a client terminal during a period of time while the broadcast content is delivered, and
    further comprising verifying a broadcast network of the client terminal and transmitting the at least one keyword after a predetermined delay time based on a type of the verified broadcast network.

* * * * *

UNITED STATES PATENT AND TRADEMARK OFFICE
CERTIFICATE OF CORRECTION

PATENT NO. : 8,925,011 B2
APPLICATION NO. : 13/556291
DATED : December 30, 2014
INVENTOR(S) : Joo Young Lee et al.

It is certified that error appears in the above-identified patent and that said Letters Patent is hereby corrected as shown below:

Title Page
    Item (73) Assignee
    Change "SK Hynix Inc., Gyeonggi-do (KR)" to --Electronics And Telecommunications Research Institute, Daejeon (KR)--.

Signed and Sealed this
Twelfth Day of April, 2016

Michelle K. Lee
*Director of the United States Patent and Trademark Office*